United States Patent

[11] 3,576,127

| [72] | Inventors | Daniel H. Weitzel;<br>Jerry C. Jellison, Boulder, Colo. |
|---|---|---|
| [21] | Appl. No. | 867,843 |
| [22] | Filed | Oct. 20, 1969 |
| [45] | Patented | Apr. 27, 1971 |
| [73] | Assignee | The United States of America as represented by the Administrator of the National Aeronautics and Space Administration |

[54] RESILIENCE TESTING DEVICE
7 Claims, 2 Drawing Figs.

[52] U.S. Cl. .................................................. 73/79, 73/12
[51] Int. Cl. ...................................................... G01n 3/52
[50] Field of Search .......................................... 73/13, 15; 356/27, 28; 73/79, 12

[56] References Cited
UNITED STATES PATENTS
2,318,993  5/1943  Hathaway ..................... 73/79

| 2,892,342 | 6/1959 | Goss | 73/12 |
| 2,992,554 | 7/1961 | Stolk | 73/12X |
| 3,067,605 | 12/1962 | Bliss | 73/79X |

FOREIGN PATENTS

| 583,504 | 9/1933 | Germany | 73/79 |
| 1,187,394 | 2/1965 | Germany | 73/79 |

Primary Examiner—Richard C. Queisser
Assistant Examiner—C. E. Snee
Attorneys—Howard J. Osborn, William H. King and G. T. McCoy ABSTRACT: This invention is an automated ball rebound resilience testing system. It is used to measure the resilient behavior of materials at varying temperatures. The apparatus consists of a light source with the beam focused on a photocell. When the light beam is interrupted as objects are dropped through it and rebounded, signals are emitted from the photocell and pass through a pulse amplifier, a counter timer and lastly are recorded on a printer, thus providing data for determining the resilience of the sample.

RESILIENCE TESTING DEVICE

ORIGIN OF THE INVENTION

The invention described herein was made by employees of the United States Government and may be manufactured and used by or for the Government for governmental purposes without payment of any royalties thereon or therefor.

BACKGROUND OF THE INVENTION

With the increased utilization of polymers in viscoelastic materials, materials with both viscous and elastic qualities, the dynamic mechanical properties of these polymers at different temperatures and loads must be studied. Temperature greatly affects viscoelastic materials, and therefore polymer characterization at these temperatures must be determined. Various methods which relate damping and frequency over various temperature and frequency ranges have been experimented with such a torsion pendulums, forced oscillations, double transducers, ultrasonic measurements, etc., as well as other impact methods of various kinds. With these methods though, precise interpretation of results has been hindered by lack of frequency data, incomplete knowledge of the impact-generated wave from and by undetermined energy loss. The principal advantages of dropping balls, as with the present invention, are speed, simplicity, and the fact that the experiment is not critically dependent on the sample shape or dimension, and the energy loss and ball-on-sample contact time is negligible. Further, it is not necessary to measure either the range or the height of the rebound. Also, by raising the beam above the sample, mirrors can be eliminated so the problem of frost forming in the optical path when testing at cryogenic temperatures is greatly simplified.

Therefore, it is an object of this invention to provide a test apparatus capable of testing the resilient behavior of materials.

A further object of this invention is to provide an apparatus for recording an interpreting the test data accurately.

Another object of this invention is to be able to test these samples at various temperatures, especially very low temperatures.

It will be further appreciated that the invention is a rather uncomplicated, although very accurate, means for determining the resilience of materials. It is also versatile in that the height of the light beam above the sample and the temperature of the sample itself may be regulated to meet the desired test conditions.

SUMMARY OF THE INVENTION

Objects, preferably balls, are dropped onto a sample surface. A photoelectric beam is positioned above the sample such that the objects will pass through this beam on their descent and again on their ascent after rebounding off the sample surface.

The times required for the objects to pass through the light beam are transmitted to an interpreting device as electric pulses. In this device, the pulses are recorded and interpreted to determine the resilience of the sample material.

The temperature of the sample can be controlled. The temperatures mainly concerned within this apparatus are in the very low range, such as around 70° K., but the apparatus can be used to test samples heated up to 450° K.

BRIEF DESCRIPTION OF THE DRAWINGS

The foregoing objects and many of the attendant advantages of this invention will become more readily appreciated as the invention becomes better understood by reference to the following detailed description when taken in conjunction with the accompanying drawings wherein.

DESCRIPTION OF THE PREFERRED EMBODIMENT

Figure 1:
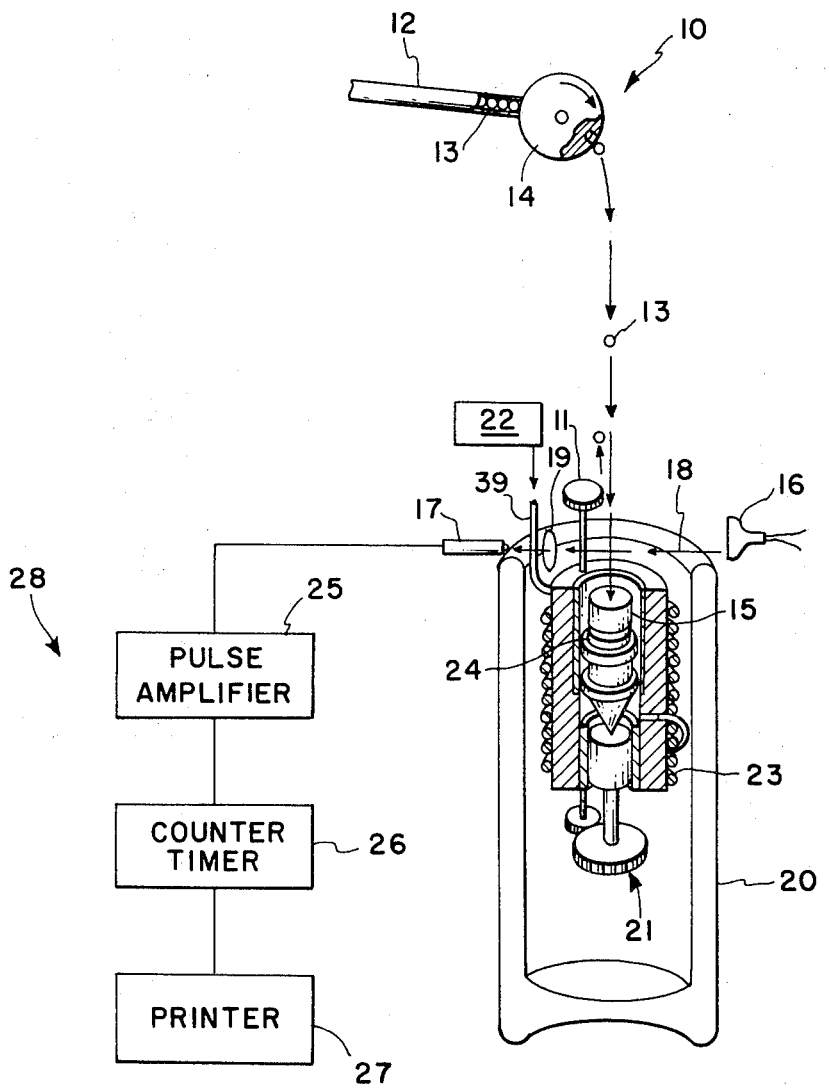
FIG. 1 is a schematic representation illustrating the general concept of the invention.

FIG. 1 illustrates the general concept and operation of the invention. It consists of a ball timer and dropper 10, a container 20 in which to place the sample and regulate its temperature, and the pulse interpreting means 28.

The balls 13 are stored and fed to the timer-dropper 14 by tube 12. The timer is actuated by hand or any suitable motor known to the art. The balls are dropped so that they do not fall at a 90° angle, therefore they do not rebound at an 90° angle, and thus one ball will not rebound into the path of the ball being dropped next, nor will it bounce back onto the sample surface. Further, this allows the balls to be dropped at equally successive intervals small enough to get a continuous accurate reading from the pulse interpreting means 28, but long enough to enable accurate data interpretation.

As the ball descends toward the sample, it passes through a light beam 18 which is generated by a light source 16. The light beam is focused on a light sensitive photocell 17 by a lens 19. As the ball passes through the beam on its descent, it interrupts the light signal to the photoelectric cell 17. The resulting pulse which is generated by photoelectric cell 17 has a duration $T_1$ and is sent to the interpreting means which will be discussed later. The duration $T_1$ is the time it takes the ball to pass through beam 18 on its descent.

After the ball passes through the light beam on its descent, it will strike the sample 15 and then rebound back up through the beam on its subsequent ascent. Again a pulse is generated by photocell 17 having a duration $T_2$. This pulse is also sent to pulse interpreting means 28. The duration $T_2$ is the time it takes the ball to pass through beam 18 on its ascent.

Depending on the resilience of the sample $H$, the height of the beam above the sample, can be adjusted by knob 11 so that resilience is simply calculated by $(T_1/T_2)^2$ by making $H$ small in comparison to the drop and rebound heights. If $H$, for some test reason, must be fairly large in comparison to the rebound height, to determine resilience, the acceleration and deceleration of the ball between the light beam and the sample must be taken into account. To be precise, resilience will be $$R = \frac{D\left(\frac{T_1}{T_2}\right)^2 + H}{D + H}$$

where $R$ is resilience, $D$ is the distance from the dropper to the sample, $T_1$ and $T_2$ are the beam crossing times on descent and ascent respectively, and $H$ is the height of the beam above the sample. As can be appreciated, when $H$ becomes very small compared to $D$, $R$ approaches simply the squared ratio of the pulse durations $T_1$ and $T_2$ as previously stated. The ball-on-sample contact time does not have to be considered, if for instance samples such as polished tungsten carbide and balls such as tungsten carbide are used, because they give essentially zero contact time and zero energy loss.

The aforementioned pulses are sent to the interpreting means 28. The pulse is first amplified by the pulse amplifier 25. It next goes to the counter-timer 26 which measures the pulse duration and sends it to a printer 27 which either prints or plots the results. The amplifier 25, counter-timer 26 and printer 27 are all of a conventional nature and available commercially.

Figure 2:
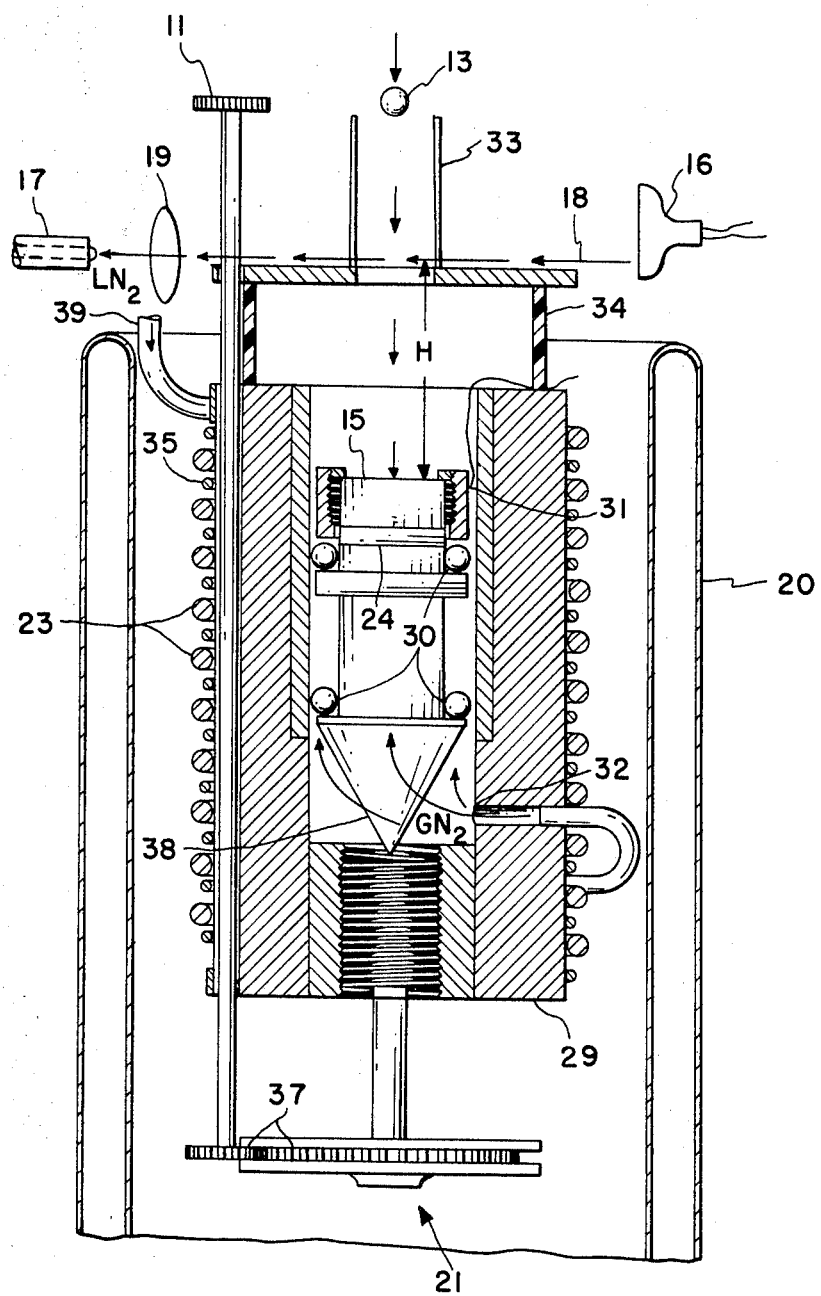
FIG. 2 is a sectional longitudinal representation of the container which holds the sample and controls its temperature.

FIG. 2 is a cross section of the sample positioning container 20. It illustrates the sample holding cylinder 29, the cooling and heating mechanisms 23 and 35 respectively, and the $H$ adjusting mechanism 21.

The sample 15 is fastened to an anvil 24 by a satisfactory means such as a threaded clamp. The height of the anvil, and thus the sample, is adjusted by adjusting knob 11 which turns gears 37 which in turn raise and lower the anvil and its supporting structure 38. Of course, by adjusting the height of the sample, $H$ is thereby adjusted as already discussed. A smooth, positive adjustment is assured by bearings 30.

As previously stated, the temperature of the sample can also be varied. Cooling is achieved by pumping liquid nitrogen ($LN_2$) from source 22 into inlet 39. The liquid nitrogen flows through coils 23 from inlet 39 which cools the copper cylinder 29 within which the sample is held, and out through opening 32, at which point the liquid nitrogen becomes gaseous. As the cylinder fills with gaseous nitrogen ($GN_2$), it will eventually spill over the top edge, thus cooling the sample. Because of the coils around the copper cylinder and the gas within the cylinder, the sample temperature is kept constant. This is also aided by positioning the whole mechanism in a Dewar vessel 20, as the Dewar vessel will act to prevent heat transfer to the sample area.

heating the sample is similar in that heating coils 35 are wrapped around the copper cylinder. As the coils heat up the cylinder walls, the heat will radiate within the sample area, thereby heating the sample. Here the Dewar vessel will prevent any heat loss from the sample area.

The temperature is monitored by thermocouple 31 which is attached to the sample by suitable means. The thermocouple is then attached to a reading device such as already known in the art.

In order to retard the escape of gas out the top when low temperatures are required, and to reduce the amount of cool air coming in through the top when heat is required, a cover 34 with an opening 38 in it is provided. This is a big help in maintaining a constant temperature since the opening of the Dewar vessel as well as the copper cylinder is rather large for purposes of keeping the temperature within constant. The cover may be made out of any suitable material, but a material such as lucite is preferable since it is clear and therefore one is still able to see the sample.

This cover also serves another purpose. As was previously mentioned, the balls which are dropped will have a slight horizontal velocity, therefore the ball's descent and subsequent ascent will not be perpendicular to the sample surface. But if the horizontal velocity is too great, the resulting data will not be accurate. To alleviate this problem a shield 33 has been put on the cover large enough so as not to interfere with the descent and ascent of the balls, but small enough to aid in keeping the constant temperature which is needed for testing and to deflect any balls which are entering the sample area at too great an angle.

OPERATION

In testing a sample with this invention, the sample is first secured to the anvil 24. The light beam 18 is then positioned a short distance above the sample surface by the adjusting knob 11. At this point, if a certain sample temperature is desired, it is obtained by the proper temperature coil, either 23 or 35. Normally, either one or the other is used, but both may be used at the same time if a rapid change in sample temperature is needed since they work independently of each other, and one contains liquid nitrogen and the other is electrical. For instance, if a lower temperature is needed, liquid nitrogen is pumped into inlet 39, through coils 23 from a commercially available container 22. If a higher temperature is required, coils 35 are electrically heated.

When the correct sample temperature is reached, which is being constantly monitored by thermocouple 31, the timer-dropper is actuated and balls will begin dropping onto the sample surface. As the balls pass through the light beam on their descent and ascent, pulses are transmitted to the interpreting means 28 by light sensitive photocell 17. These pulses are amplified, measured and then printed for a permanent record. This process continues for the required time limit or until all the balls are dropped. During the operation, the height of the light beam and the temperature may be adjusted at will to meet the required test conditions.

What is claimed as new and desired to be secured by Letters Patent of the United States is:

We claim:

1. Apparatus for providing data which can be used to determine the resilience of a material comprising:
    a sample of said material;
    a metal object;
    means for dropping said object on said sample; means for producing a first electrical pulse whose duration is proportional to the time it takes said object to fall through a first predetermined interval in the falling path of said object and for producing a second electrical pulse whose duration is proportional to the time it takes to rebound through a second predetermined interval in the rebounding path of said object, said first and second intervals being equal and at an equal distance from said sample; and means for recording the duration of said first and second electrical pulses whereby the resilience of said material can be determined from said recording.

2. Apparatus according to claim 8 wherein said means for producing said first and second electrical pulses includes a light beam that traverses the paths of said object at said first and second intervals onto a photocell whereby the object interrupts the light beam to the photocell as the object passes said intervals.

3. Apparatus according to claim 8 including means for changing the distance from said intervals to said sample.

4. Apparatus according to claim 8 including means for heating said sample.

5. Apparatus according to claim 8 including means for cooling said sample.

6. Apparatus according to claim 8 wherein said means for dropping an object includes means for dropping many objects at a controlled rate.

7. Apparatus according to claim 1 wherein said metal object is in the shape of a sphere and is unattached to any other object.